US012395891B2

(12) United States Patent
Kim et al.

(10) Patent No.: US 12,395,891 B2
(45) Date of Patent: Aug. 19, 2025

(54) BASE STATION LOAD BALANCING METHOD AND APPARATUS

(71) Applicant: ELECTRONICS AND TELECOMMUNICATIONS RESEARCH INSTITUTE, Daejeon (KR)

(72) Inventors: Tae Jung Kim, Daejeon (KR); Donghun Lee, Daejeon (KR); Jeehyeon Na, Daejeon (KR); Jung Mo Moon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 387 days.

(21) Appl. No.: 17/964,597

(22) Filed: Oct. 12, 2022

(65) Prior Publication Data

US 2023/0134583 A1 May 4, 2023

(30) Foreign Application Priority Data

Oct. 29, 2021 (KR) ........................ 10-2021-0147009

(51) Int. Cl.

*H04W 24/02* (2009.01)
*H04W 28/08* (2023.01)
*H04W 28/086* (2023.01)

(52) U.S. Cl.

CPC ....... *H04W 28/0942* (2020.05); *H04W 24/02* (2013.01); *H04W 28/0861* (2023.05)

(58) Field of Classification Search

CPC .......................... H04W 28/0861; H04W 24/02
USPC ........................................ 370/329, 400, 403
See application file for complete search history.

(56) References Cited

U.S. PATENT DOCUMENTS

| | | | |
|---|---|---|---|
| 8,688,120 | B2 | 4/2014 | Song et al. |
| 10,271,242 | B2 | 4/2019 | Lee et al. |
| 2015/0289158 | A1 | 10/2015 | Shim et al. |
| 2019/0279082 | A1 | 9/2019 | Moloney et al. |

FOREIGN PATENT DOCUMENTS

| | | | |
|---|---|---|---|
| KR | 10-2015-0031067 | 3/2015 | |
| KR | 10-2020-0097623 | 8/2020 | |
| WO | WO-201116674 A1 * | 9/2011 | ........ H04W 72/0486 |

OTHER PUBLICATIONS

Md Mehedi Hasan et al., "Adaptive Mobility Load Balancing Algorithm for LTE Small-Cell Networks," IEEE Transactions on Wireless Communications, Jan. 12, 2018 (Current Version Apr. 8, 2018), pp. 2205-2217, vol. 17, No. 4, IEEE.

(Continued)

*Primary Examiner* — Dang T Ton
(74) *Attorney, Agent, or Firm* — KILE PARK REED & HOUTTEMAN PLLC

(57) ABSTRACT

A method for load balancing in a base station is provided. The base station updates a traffic amount of a current time by reflecting a predicted traffic amount of a future time in the traffic amount of the current time, and determines parameters necessary for load balancing of the base station by comparing the updated traffic amount of the current time with a predetermined threshold.

17 Claims, 7 Drawing Sheets

(56) References Cited

OTHER PUBLICATIONS

Ghada Alsuhli et al., "Mobility Load Management in Cellular Networks: A Deep Reinforcement Learning Approach," IEEE Transactions on Mobile Computing, Aug. 30, 2021 (Current Version Feb. 3, 2023), pp. 1581-1598, vol. 22, No. 3, IEEE.
Sangchul Oh et al., "User Mobility Impacts to Mobility Load Balancing for Self-Organizing Network over LTE System," 2018 14th International Conference on Advanced Trends in Radioelectronics, Telecommunications and Computer Engineering (TCSET), Feb. 20-24, 2018, pp. 1082-1086, IEEE.

* cited by examiner $$E = \min(1, \delta \times \text{standard deviation of Accuracy}), \ 0 \le \delta < 1$$

```
If Random(0,1) < E
    S = Random Index choice
Else
    S = High Accuracy Index choice
```

$$\text{Average Weight} = \frac{1}{S}\sum_{i=1}^{S}(w_i)$$

BASE STATION LOAD BALANCING METHOD AND APPARATUS

CROSS-REFERENCE TO RELATED APPLICATION

This application claims priority to and the benefit of Korean Patent Application No. 10-2021-0147009 filed in the Korean Intellectual Property Office on Oct. 29, 2021, the entire contents of which are incorporated herein by reference.

BACKGROUND OF THE INVENTION

(a) Field of the Invention

The present invention relates to a base station load balancing method and apparatus, and more particularly, to a base station load balancing method and apparatus capable of effectively monitoring an overload state of a base station and distributing a load.

(b) Description of the Related Art

Recently, with the advent of the 5G mobile communication era, the demand for services such as remote robot control, vehicle autonomous driving, drone control, unmanned aerial vehicle (UAV), and augmented reality (AR)/virtual reality (VR) requiring large data is increasing.

With the development of various terminals and the exponential increase in services based on large-capacity content, the traffic that base stations have to process is greatly increasing.

Mobile communication base stations using high frequency are developing into structures that can provide high-capacity data services, but in order to satisfy all user needs, it is necessary to construct high-density base stations, and it is becoming increasingly difficult for an operator to manage the high-density base stations due to cost and complexity.

SUMMARY OF THE INVENTION

The present invention has been made in an effort to a base station load balancing method and apparatus capable of effectively controlling the overload of the base station while minimizing intervention of the operator.

According to an exemplary embodiment, a base station load balancing method in a base station is provided. The base station load balancing method includes: updating a traffic amount of a current time by reflecting a predicted traffic amount of a future time in the traffic amount of the current time; and determining parameters necessary for load balancing of the base station by comparing the updated traffic amount of the current time with a predetermined threshold.

The updating may include predicting the traffic amount of the future time from the traffic amount of the current time using a prediction model, and the weight value of the prediction model may be determined through federated learning between a service and operation management system and a plurality of base stations.

The base station load balancing method may further include: learning a machine learning model using learning data; updating the machine learning model; and repeating the learning of the machine learning model and updating of the machine learning model to use the machine learning model as the predictive model.

The updating of the machine learning model may include: transmitting a weight value and learning accuracy according to the learning result of the machine learning model to the service and operation management system; receiving a global weight value determined by the service and operation management system based on the weight values and learning accuracy received from the plurality of base stations; and updating a weight value of the machine learning model with the global weight value.

The global weight value may be an average value of part of the weight values received from the plurality of base stations, and the part of the weight values may be randomly selected according to a standard deviation for learning accuracy provided by the plurality of base stations, or are selected in the order of high learning accuracy.

The updating may include calculating the traffic amount at the current time by applying a first weight value and a second weight value to downlink physical resource block (PRB) usage and uplink PRB usage, respectively, and the first weight value and the second weight value may be determined according to a ratio of PRBs allocated to downlink and uplink in the entire PRB.

The updating may include applying a first weight value to the traffic amount of the current time and applying a second weight value to the predicted traffic amount of the future time, and the first weight value may be set to be greater than the second weight value.

The determining may include adjusting handover-related parameters so that the terminals at the edge of the base station move to another base station earlier if the updated traffic amount at the current time is greater than the threshold value.

According to another embodiment, a base station load balancing method for balancing load of a plurality of base stations in a base station load control apparatus is provided. The base station load balancing method includes: generating and managing policies necessary for the load balancing operation; modifying the policies using a load balancing result of an overloaded base station; and determining a weight value of a machine learning model used for predicting traffic of a future time in the plurality of base stations by performing federated learning with the plurality of base stations.

The determining may include: receiving a weight value and learning accuracy according to a learning result of the machine learning model from the plurality of base stations, respectively; calculating a global weight value based on the weight values and learning accuracy received from the plurality of base stations; and transmitting the global weight value to the plurality of base stations so that the plurality of base stations update the weight values of the machine learning model with the global weight value.

The calculating may include: selecting weight values of part of the weight values received from the plurality of base stations according to the standard deviation for the learning accuracy provided by the plurality of base stations; and calculating an average of the selected weight values of the part as the global weight value.

The selecting may include: randomly selecting the weight values of the part if a random value between 0 and 1 is less than a value corresponding to the standard deviation; and selecting the weight values of the part in order of high learning accuracy if the random value is equal to or greater than a value calculated based on the standard deviation.

According to yet another embodiment, a base station load balancing apparatus for load balancing by interworking with a service and operation management system in a base station is provided. The base station load balancing apparatus includes: a local traffic predictor that predicts a traffic amount in a future time using a prediction model; and a load balancing processor that updates a traffic amount of a current time by reflecting the predicted traffic amount of the future time in the traffic amount of the current time, and determines parameters necessary for load balancing of the base station by comparing the updated traffic amount of the current time with a predetermined threshold.

The local traffic predictor may include: a model updater for updating a machine learning model with a global weight value determined by the service and operation management system through federated learning between a plurality of base stations and the service and operation management system; and a model learner for learning the updated machine learning model, and the prediction mode may be finally generated through repetition of the learning the machine learning model and updating the machine learning model.

The model learner may transmit a weight value and learning accuracy according to a learning result of the machine learning model to the service and operation management system, and the global weight value may be determined by the service and operation management system based on the weight values and learning accuracy received from the plurality of base stations.

The global weight value may be an average value of part of the weight values received from the plurality of base stations, and the part of the weight values may be randomly selected according to a standard deviation for learning accuracy provided by the plurality of base stations, or are selected in the order of high learning accuracy.

The load balancing processor may include an overload determiner for calculating the updated traffic amount of the current time by applying a first weight value to the traffic amount of the current time and applying a second weight to the predicted traffic amount of the future time, and the first weight value may be set to be greater than the second weight value.

The load balancing processor may include a mobility load balancing (MLB) controller for adjusting handover-related parameters so that the terminals at the edge of the base station move to another base station earlier if the updated traffic amount at the current time is greater than the threshold value.

DETAILED DESCRIPTION OF THE EMBODIMENTS

Figure 1:
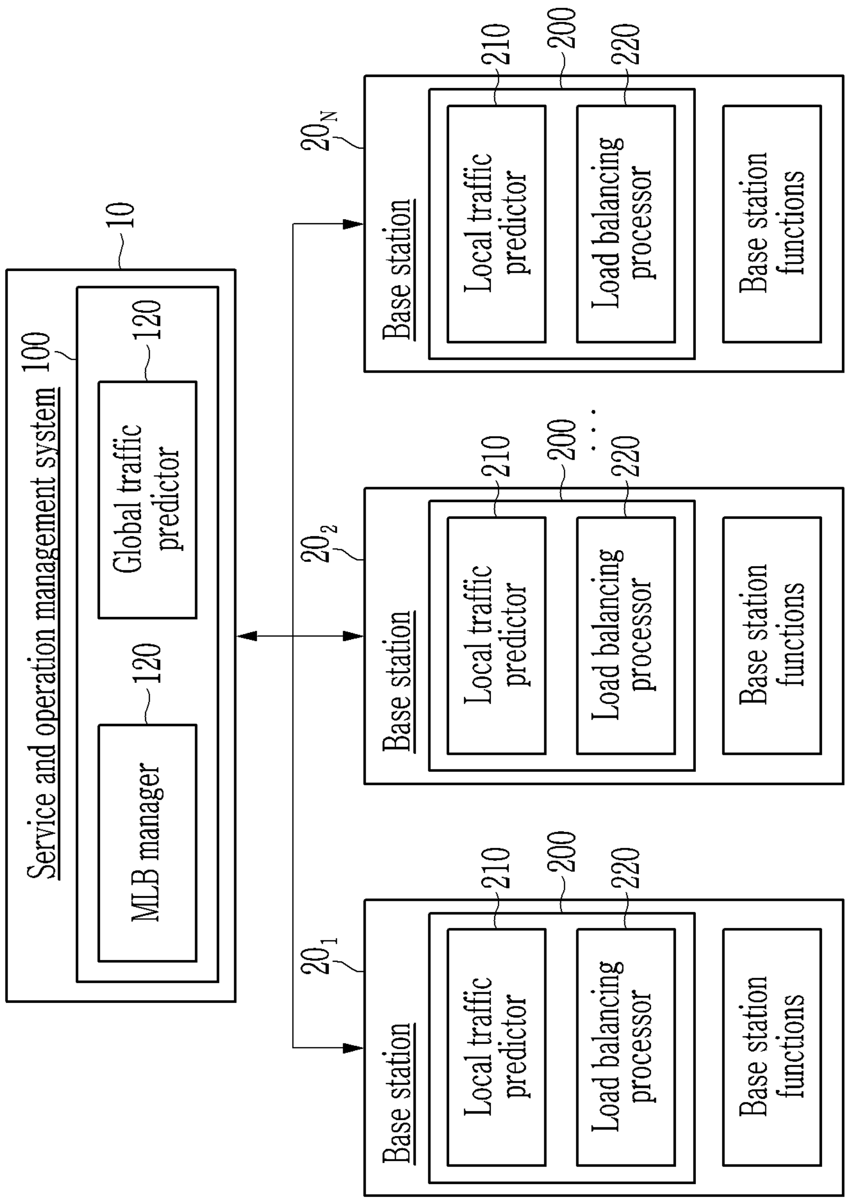
FIG. 1 is a diagram for explaining load balancing of base stations according to an embodiment of the present invention.

Hereinafter, embodiments of the disclosure will be described in detail with reference to the attached drawings so that a person of ordinary skill in the art may easily implement the disclosure. As those skilled in the art would realize, the described embodiments may be modified in various different ways, all without departing from the spirit or scope of the disclosure. The drawings and description are to be regarded as illustrative in nature and not restrictive. Like reference numerals designate like elements throughout the specification.

Throughout the specification and claims, when a part is referred to "include" a certain element, it means that it may further include other elements rather than exclude other elements, unless specifically indicated otherwise.

Furthermore, in this specification, each of the phrases such as "A or B", "at least one of A and B", "at least one of A or B", "A, B, or C", "at least one of A, B, and C", and "at least one of A, B, or C" may include any one of the items listed together in the corresponding one of the phrases, or all possible combinations thereof.

Now, a base station load balancing method and apparatus according to an embodiment will be described in detail with reference to the drawings.

FIG. 1 is a diagram for explaining load balancing of base stations according to an embodiment of the present invention.

Referring to FIG. 1, the service and operation management system 10 includes a base station load balancing apparatus 100 that monitors a plurality of base stations $\mathbf{20}_1$ to $\mathbf{20}_N$ managed by an operator and predicts load states of the base station $\mathbf{20}_1$ to $\mathbf{20}_N$.

The base station load balancing apparatus 100 includes a mobility load balancing (MLB) manager 110 and a global traffic predictor 120.

The MLB manager 110 monitors the traffic state (overload state) for all the base stations $\mathbf{20}_1$ to $\mathbf{20}_N$ operated by the network operator, and generates and manages policies necessary for the MLB optimization operation. In addition, the MLB manager 110 evaluates the MLB execution result executed by the policies, and supplements the policies through the MLB evaluation.

The global traffic predictor 120 optimizes the traffic prediction in the local traffic predictor 210 of each base station $\mathbf{20}_1$ to $\mathbf{20}_N$ while exchanging and updating information necessary for machine learning by interworking with the local traffic predictor 210 of each base station $\mathbf{20}_1$ to $\mathbf{20}_N$.

Each of the base stations $\mathbf{20}_1$ to $\mathbf{20}_N$ includes a base station load balancing apparatus 200 that performs traffic prediction and load balancing.

The base station load balancing apparatus 200 includes a local traffic predictor 210 and a load balancing processor 220.

The local traffic predictor 210 calculates new traffic reflecting the traffic of the future time from the current time. The local traffic predictor 210 collects traffic at the current time, and predicts traffic at a future time using a machine learning model from the traffic at the current time.

The load balancing processor 220 calculates a new traffic amount reflecting the traffic of the future time at the current time using the traffic usage of the current time and the traffic information of the future time predicted by the local traffic predictor 210, and determines the parameters necessary for load balancing of the base station based on the calculated new traffic amount.

The determined parameters are transferred to the relevant base station functions.

Related base station functions update base station configuration information by reflecting the parameters determined by the load balancing processor 220, and transmit measurement configuration information to the terminal based on the updated base station configuration information. The terminal performs measurement based on the measurement configuration information.

Figure 2:
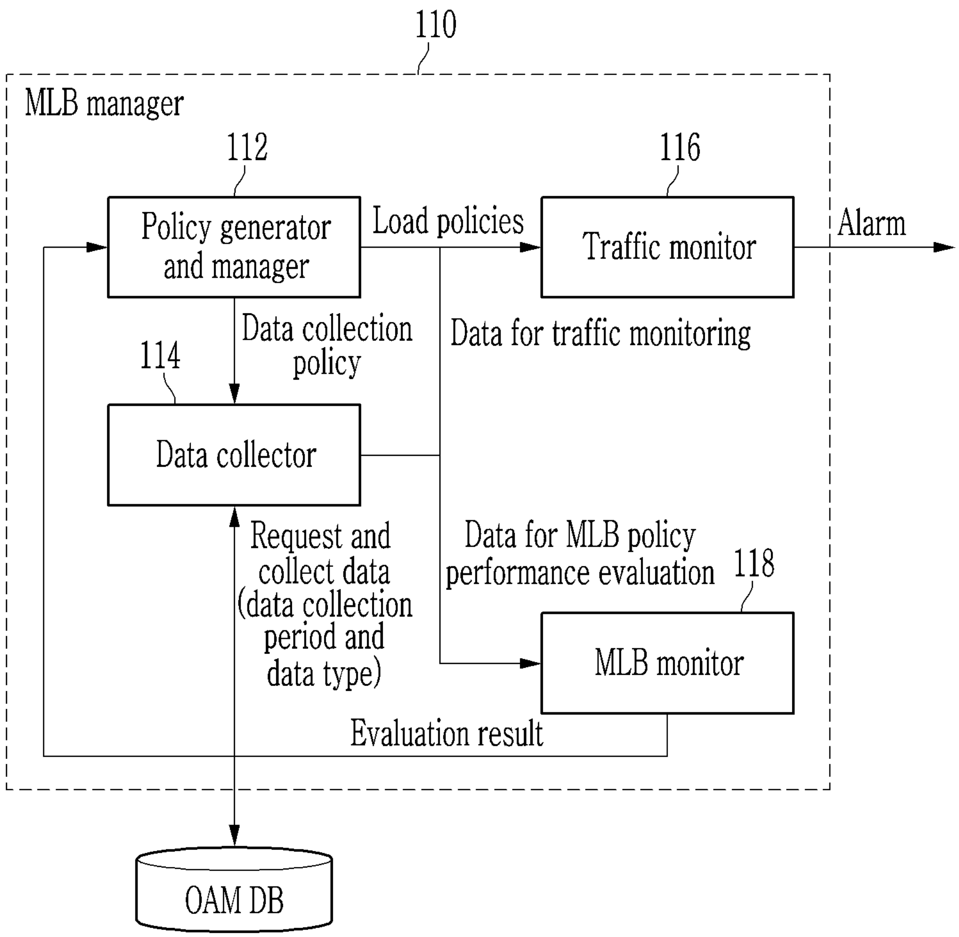
FIG. 2 is a diagram illustrating the MLB manager shown in FIG. 1.

FIG. 2 is a diagram illustrating the MLB manager shown in FIG. 1.

Referring to FIG. 2, the MLB manager 110 may include a policy generator and manager 112, a data collector 114, a traffic monitor 116, and an MLB monitor 118.

The policy generator and manager 112 generates and manages policies necessary for MLB optimization operation. The policy generator and manager 112 may generate load policies that set criteria for determining overload of the traffic monitor 116. For example, the load policies may include a threshold for determining whether or not an overload is present. The policy generator and manager 112 may generate a data collection policy indicating a performance measurement (PM) data type and a data collection period.

The policy generator and manager 112 may supplement the policies using the MLB performance result evaluated by the MLB monitor 118. The policy generator and manager 112 may delete, modify, and generate the policies based on evaluation result information obtained by evaluating the load balancing performance result of the overloaded base station.

The data collector 114 collects PM data collected from each base station based on the data collection policy transmitted from the policy generator and manager 112. The PM data collected by each base station may be stored in an operation administration maintenance (OAM) DB. Furthermore, the data collector 114 transmits data for traffic monitoring and data for MLB policy performance evaluation among the collected PM data to the traffic monitor 116 and the MLB monitor 118, respectively.

Table 1 shows data for traffic monitoring and MLB policy performance evaluation.

TABLE 1

| | Mandatory | Optional (Enrichment) |
|---|---|---|
| Traffic monitoring | Downlink (DL)/Uplink (UP) PRB (Physical resource block) Usage<br>DL/UL PRB used for data traffic<br>DL/UL total available PRB | RRC connection number related Information<br>Number of Active UEs related Information |
| MLB policy performance evaluation | Failed Handover related Information<br>Measurement related Information to MRO (Too Early, Too Late, To Wrong) | Ping-Pong related Information<br>UE throughput |
| Learning data | DL/UL PRB Usage<br>Number of Active UEs | PM data generated by the base station |

As defined in Table 1, in addition to mandatory data, optional data may be transmitted to the traffic monitor 116 and the MLB monitor 118 for more effective monitoring and evaluation. In addition, the data shown in Table 1 is an example, and other information not mentioned in Table 1 may be used for traffic monitoring and MLB policy performance evaluation.

The traffic monitor 116 recognizes an overload state for all base stations $20_1$ to $20_N$ operated by a network operator based on the load policies provided by the policy generator and manager 112 and performs a function of alarming the overload state.

A determination criterion that satisfies the alarm condition in the traffic monitor 116 may be defined as Equation 1. The traffic monitor 116 calculates the amount of traffic at the current time of the corresponding base station based on the downlink PRB usage and the uplink PRB usage of the base station corresponding to the cell identifier Cellio as shown in Equation 1, determines that the corresponding base station is in an overload state if the amount of traffic at the current time is greater than the threshold for the load policy, and may transmit an alarm to the base station in the overload state. That is, the traffic monitor 116 calculates the traffic of the base station based on Equation 1 and informs an overload state to the base station in the overload state.

$$(\alpha \cdot PRBU[cell\_ID]_{DL}{}^{T}+\beta \cdot PRBU[cell_{ID}]_{UL}{}^{T})>\text{Thredshold}\ \alpha+\beta=1 \quad \text{(Equation 1)}$$

Here, $PRBU[cell\_ID]_{DL}{}^{T}$ denotes downlink PRB usage, and $PRBU[cell\_ID]_{DL}{}^{T}$ denotes uplink PRB usage. α and β are variables that determine the weights of the downlink PRB usage and the uplink PRB usage, and may be determined according to the PRB ratio allocated to the downlink and the uplink in the entire PRB. Threshold indicates a threshold value for the load policy generated by the policy generator and manager 112, and the unit is %.

The MLB monitor 118 evaluates the result performed by the overloaded base station for load balancing using the MLB algorithm and transmits the evaluation result to the policy generator and manager 112, and the policy generator and manager 112 may modify the policies in case of a wrong result.

For MLB policy performance evaluation, the MLB monitor 118 periodically collects data for MLB policy performance evaluation shown in Table 1 and performs MLB policy performance evaluation. The performance evaluation method compares the statistics before and after MLB operation, including the number of handover attempts that have failed, mobility robust optimization (MRO) related statistical information, the number of ping-pongs, and other additional information. Next, if the comparison result is out of a certain ratio defined by the operator, the MLB monitor 118 may instruct to the policy generator and manager 112 to modify the policies related to MLB operation.

Figure 3:
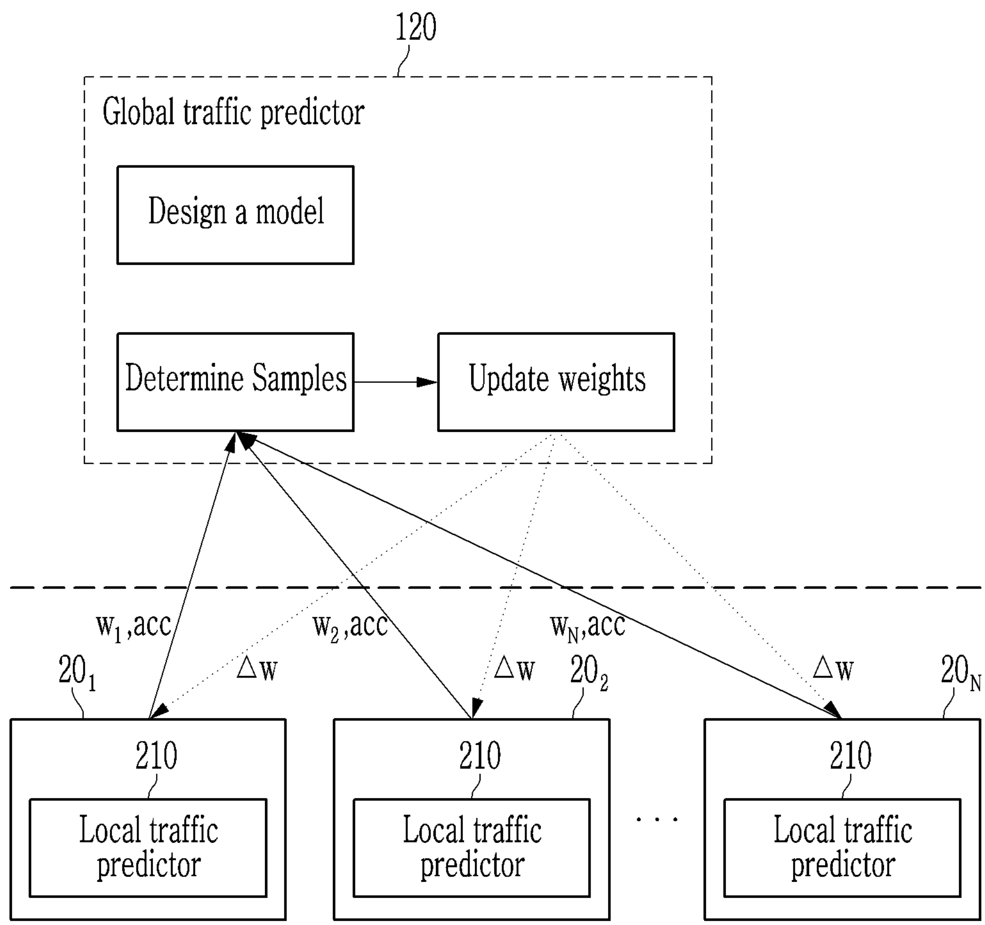
FIG. 3 is a diagram for explaining a method of optimizing a weight value of a machine learning model by interworking between the global traffic predictor and the local traffic predictor of each base station shown in FIG. 1.

FIG. 3 is a diagram for explaining a method of optimizing a weight value of a machine learning model by interworking between the global traffic predictor and the local traffic predictor of each base station shown in FIG. 1.

Referring to FIG. 3, by extending a federated learning technique of machine learning, the global traffic predictor 120 and the local traffic predictor 210 of each base station $20_1$ to $20_N$ share weight values of the machine learning model with each other, and update weight values of the machine learning model by interacting with each other.

The global traffic predictor 120 designs an initial machine learning model. Then, the unlearned initial machine learning model is transferred to the local traffic predictor 210 of each base station $20_1$ to $20_N$.

The local traffic predictor 210 of each base station $20_1$ to $20_N$ performs learning on the machine learning model based on the PM data collected by each base station $20_1$ to $20_N$. After learning the machine learning model for one predetermined learning cycle, the local traffic predictor 210 of each base station $20_1$ to $20_N$ transmits weights $W_1$ to $W_N$ and learning accuracy (acc) according to the learning result to the global traffic predictor 120. Here, the unit of learning accuracy varies depending on the machine learning model, and in the case of a classification model, it may be a percentage. In the case of a regression model, learning accuracy means an error value due to a loss function such as mean squared error (MSE), mean of absolute scaled errors (MASE), and root mean squared error (RMSE).

The global traffic predictor 120 performs sample determination using the weights $W_1$ to $W_N$ and the learning accuracy acc received from the local traffic predictor 210 of each base station $20_1$ to $20_N$. The global traffic predictor 120 determines a weight value $\Delta w$ of the machine learning model using a specific number of weights selected through sample determination, and transmits the weight value $\Delta w$ to the local traffic predictor 210 of each base station $20_1$ to $20_N$. The local traffic predictor 210 of each base station $20_1$ to $20_N$ updates the weight value $W_1$ to $W_N$ of the machine learning model as the weight value $\Delta w$, respectively.

A method of determining the weight value $\Delta w$ of the machine learning model in the global traffic predictor 120 will be described with reference to FIG. 4.

Figure 4:
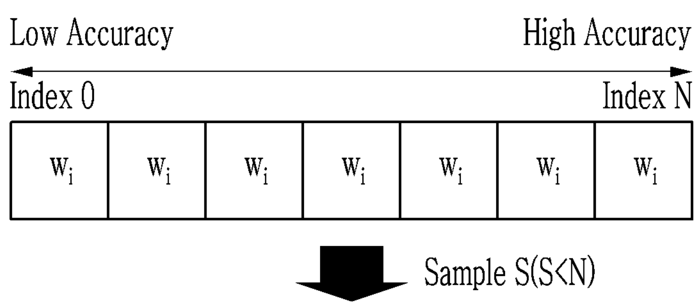
FIG. 4 is a diagram for explaining a method of determining a weight value in the global traffic predictor shown in FIG. 3.

FIG. 4 is a diagram for explaining a method of determining a weight value in the global traffic predictor shown in FIG. 3.

Referring to FIG. 4, the global traffic predictor 120 selects a specific number of weights from among the weights $W_1$ to $W_N$ received from the local traffic predictor 210 of each base station $20_1$ to $20_N$, and may determine an average of the selected weights as the weight value $\Delta w$ of the machine learning model to be updated.

The global traffic predictor 120 first sorts the weights $W_1$ to $W_N$ received from the local traffic predictor 210 of each base station $20_1$ to $20_N$ in order of accuracy. In the regression model, a smaller learning accuracy value means higher accuracy. It is difficult to reflect the characteristics of the base stations $20_1$ to $20_N$ and the convergence of learning may be delayed if the average is calculated average with all weights $W_1$ to $W_N$ of the base stations $20_1$ to $20_N$. Accordingly, the global traffic predictor 120 samples S weights from among the N weights $W_1$ to $W_N$ and calculates an average of the S weights. Here, since the effect on learning is different depending on the sampling method, an effective sampling method of the global traffic predictor 120 is proposed.

The global traffic predictor 120 may randomly sample and select S weights by sampling, but if only the weights that do not learn well are selected, the learning effect may be reduced. Therefore, the global traffic predictor 120 uses a method of randomly selecting S weights at the beginning of learning, exploring the weights of all base stations, and selecting only the weights of base stations with high accuracy whenever the number of times of learning increases. The global traffic predictor 120 randomly selects S weights from among N weights $W_1$ to $W_N$ if the random value between 0 and 1 is less than the value E of Equation 2, and selects S weights from among the N weights $W_1$ to $W_N$ in the order of learning accuracy if the random value between 0 and 1 is equal to or greater than the value E of Equation 2, using a characteristic that the standard deviation of the weights $W_1$ to $W_N$ provided by each base station $20_1$ to $20_N$ becomes smaller as the number of times of learning increases.

$$E=\min(1,\delta\times\text{Std}),\ 0\le\delta<1 \qquad \text{(Equation 2)}$$

Here, $\delta$ can be defined by the operator and has a value between 0 and 1, and Std represents the standard deviation of the learning accuracy acc provided by each base station $20_1$ to $20_N$.

After selecting the S weights, the global traffic predictor 120 calculates an average weight of the S weights as shown in Equation 3.

$$\text{Average Weight} = \frac{1}{S}\sum_{i=1}^{S}(w_i) \qquad \text{(Equation 3)}$$

The global traffic predictor 120 determines the calculated average weight as a weight value of the machine learning model to be updated, and transmits the average weight to the local traffic predictor 210 of each base station $20_1$ to $20_N$.

The local traffic predictor 210 of each base station $20_1$ to $20_N$ updates the weight value of the machine learning model to the received average weight, and performs learning on the machine learning model based on the collected PM data.

Figure 5:
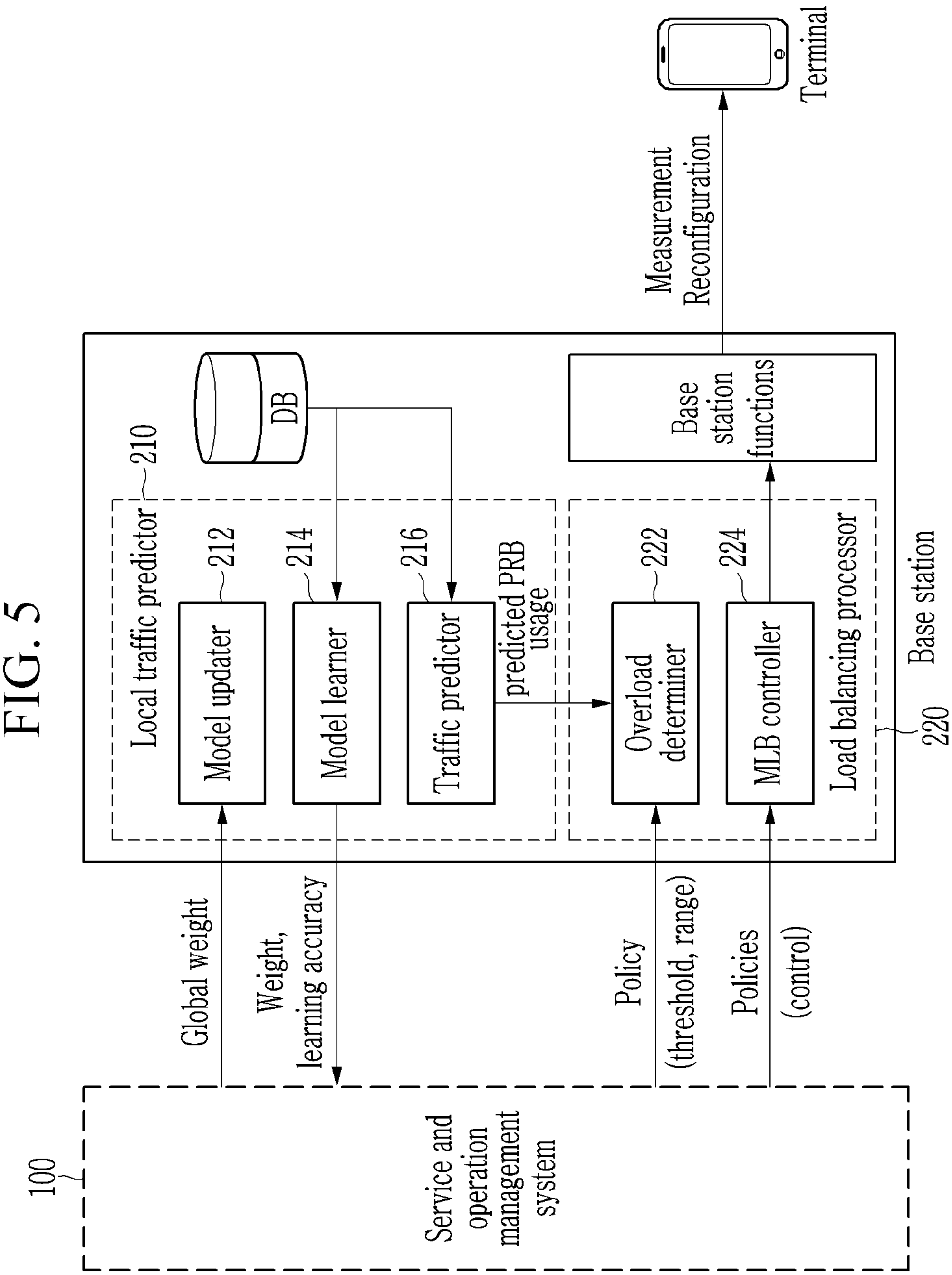
FIG. 5 is a diagram illustrating a detailed configuration of a base station load balancing apparatus in the base station shown in FIG. 1.

FIG. 5 is a diagram illustrating a detailed configuration of a base station load balancing apparatus in the base station shown in FIG. 1.

Referring to FIG. 5, the local traffic predictor 210 includes a model updater 212, a model learner 214, and a traffic predictor 216.

The model updater 212 updates the machine learning model. The model updater 212 may receive the global weight from the global traffic predictor 120 and update the weight value of the machine learning model to the global weight. The global weight means an average weight calculated by the global traffic predictor 120.

The model learner 214 learns the updated machine learning model. The model learner 214 may learn the machine learning model by using the learning data stored in the DB. When the learning of the machine learning model is completed, the model learner 214 stores the weight w and the learning accuracy acc of the machine learning model, and transmits the weight w and the learning accuracy acc to the global traffic predictor 120.

The machine learning model update of the model updater 212 and the machine learning model of the model learner 214 are repeated until the learning is finally completed, and the finally learned machine learning model is used as a prediction model to predict traffic in the traffic predictor 216.

The traffic predictor 216 predicts the amount of traffic in the future time after a predetermined time from data input in real time by using the prediction model, and transmits the predicted amount of traffic of the future time to the load balancing processor 220.

The load balancing processor 220 includes an overload determiner 222 and an MLB controller 224.

The overload determiner 222 receives policies required for MLB optimization operation from the MLB manager 110 of the service and operation management system 100. The overload determiner 222 receives the predicted traffic amount from the local traffic predictor 210, and generates a new traffic amount New PRBU reflecting the traffic amount $PRBU_{Predicted}$ of the future time from the current time, using the predicted traffic amount $PRBU_{Predicted}$ and the traffic usage $PRBU_{Current}$ of the current time as in Equation 4.

$$\text{New } PRBU = \frac{w_1\times PRBU_{Current}, +w_{12}\times PRBU_{Predicted}}{w_1+w_2} \qquad \text{(Equation 4)}$$

$$w_1 > w_2$$

Here, $W_1$ and $W_2$ are weight values r applied to the traffic amount of the current time and the traffic amount of the future time, respectively, and $W_1$ has a greater value than $W_2$. $PRBU_{Current}$ indicates the downlink and uplink PRB usage at the current time as shown in Equation 1. $PRBU_{Predicted}$ indicates the amount of traffic in the future time predicted by the traffic predictor 216.

The overload determiner 222 determines the overload by using the threshold determined by the policy and the new traffic amount New PRBU.

MLB hands over the terminals at the edge to distribute the load of the overloaded base station. In all communication technologies (4G, LTE, and 5G), handover is determined by the base station based on the measurement report of the terminal.

3GPP proposes a set of measurement reporting mechanisms to be performed by the terminal in order to minimize unnecessary handover, and this is called an event. The event type to be reported by the terminal is indicated by the RRC signaling message transmitted from the base station. 3GPP TS 38.331 defines eight event types in 5G NR. As shown in Table 2, all events have an offset called hysteresis.

TABLE 2

| Event | Parameter | Range | | Value | |
|---|---|---|---|---|---|
| A1, A2, | RSRP Threshold | 0 | 127 | −156 dBm | −31 dBm |
| A4, A5, | RSRQ Threshold | 0 | 127 | −40 dB | 20 dB |
| B1 | SINR Threshold | 0 | 127 | −23 dB | 40 dB |
| All | Hysteresis | 0 | 30 | 0 dB | 15 dB |
| A3, A6 | Offset | −30 | 30 | −15 dB | +15 dB |
| A3, A4, A5, A6, B1, B2 | Cell Specific Offset (CIO) | | | −24 dB | +24 dB |
| B1, B2 | LTE RSRP | 0 | 97 | −140 dBm | −44 dBm |
| | LTE RSRQ | 0 | 34 | −19.5 dB | −3 dBm |
| | LTE SINR | 23 | 40 | −23 dB | 40 dB |

When the overload is determined by the overload determiner 222, the MLB controller 224 optimizes handover-related measurement configuration parameters so that terminals connected to its own base station can be moved to another base station.

The MLB controller 224 adjusts the terminal to handover earlier or the terminal to stay in its base station for a longer period according to the load state of the base station by optimizing the hysteresis values.

The MLB controller 224 transmits the optimized measurement configuration parameters to the related base station function. The MLB controller 224 may delete or cancel the measurement configuration parameters according to the policies received from the MLB manager of the service and operation management system 100.

Figure 6:
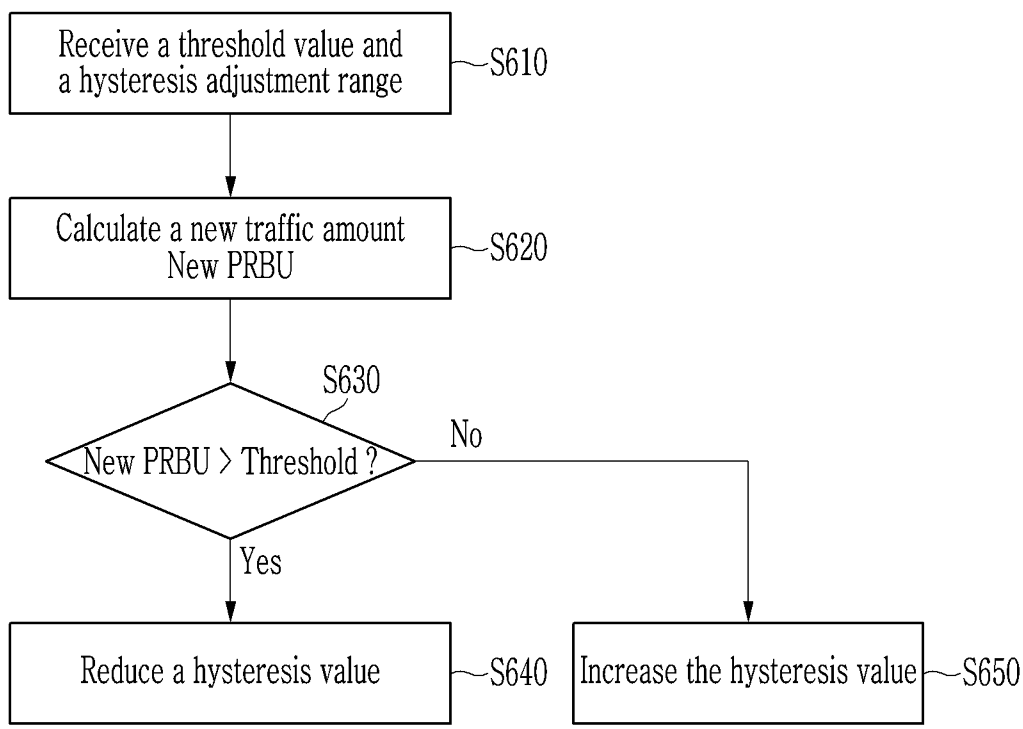
FIG. 6 is a diagram for explaining a method of optimizing parameters in the load balancing processor shown in FIG. 5.

FIG. 6 is a diagram for explaining a method of optimizing parameters in the load balancing processor shown in FIG. 5.

Referring to FIG. 6, the overload determiner 222 calculates the amount of traffic at the current time by collecting the traffic (uplink and downlink PRB usage) of the base station at the current time. The amount of traffic at the current time may be calculated based on the downlink PRB usage and the uplink PRB usage of the base station as shown in Equation 1.

The overload determiner 222 receives a threshold value and a hysteresis adjustment range for the A3 event among the policies generated by the MLB manager of the service and operation management system 100 (S610). The initial hysteresis value and the threshold value are determined by the policies, and the values are transmitted to the base station as an initial set value when operating the base station. In the embodiment, it is shown that the middle value (7 dB) of the hysteresis range is used as the initial hysteresis value for effective operation, as shown in Table 2.

The overload determiner 222 receives the predicted traffic amount of the future time from the local traffic predictor.

The overload determiner 222 calculates a new traffic amount New PRBU reflecting the traffic amount of the future time at the current time by using the predicted traffic amount of the future time and the calculated traffic amount of the current time (S620).

The overload determiner 222 determines the overload by comparing the new traffic amount New PRBU of the current time with the threshold (S630).

When the new traffic amount New PRBU is greater than the threshold value, the MLB controller 224 reduces a hysteresis value by a predetermined dB (S640), so that the terminals can move to another base station earlier.

On the other hand, when the new traffic amount New PRBU is less than or equal to the threshold value, the MLB controller 224 increases the hysteresis value by a predetermined dB (S650), so that the terminals can access the currently connected base station for a longer period of time.

By applying the method for optimizing the parameters described in the embodiment, offsets of eight events can be optimized.

Figure 7:
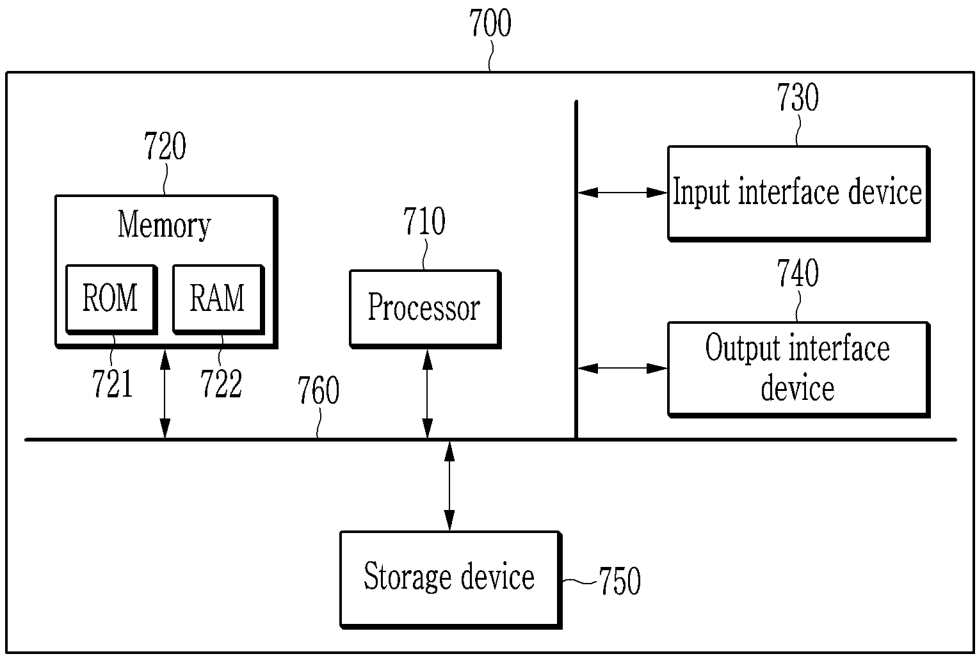
FIG. 7 is a diagram illustrating a base station load balancing apparatus according to another embodiment.

FIG. 7 is a diagram illustrating a base station load balancing apparatus according to another embodiment.

Referring to FIG. 7, the base station load balancing apparatus 700 may represent a computing device in which the method for load balancing of a base station is implemented.

The base station load balancing apparatus 700 may be implemented in the base station. Alternatively, the base station load balancing apparatus 700 may be implemented in a service and operation management system 100.

The base station load balancing apparatus 700 may include at least one of a processor 710, a memory 720, an input interface device 730, an output interface device 740, and a storage device 750. Each of the components may be connected by a common bus 760 to communicate with each other. In addition, each of the components may be connected through an individual interface or a separate bus centering on the processor 710 instead of the common bus 760.

The processor 710 may be implemented as various types such as an application processor (AP), a central processing unit (CPU), a graphics processing unit (GPU), etc., and may be any semiconductor device that executes a command stored in the memory 720 or the storage device 750. The processor 710 may execute program commands stored in at least one of the memory 720 and the storage device 750.

In the case of the base station load balancing apparatus 700 implemented in the base station, the processor 710 stores program commands for implementing at least some functions of the local traffic predictor 210 and the load balancing processor 220 in the memory 720, and may control to perform the operation described with reference to FIGS. 1 to 6.

In addition, in the case of the base station load balancing apparatus 700 implemented in the service and operation management system 100, the processor 710 stores program commands for implementing at least some functions of the MLB manager 110 and the global traffic predictor 120 in the memory 720, and may control to perform the operation described with reference to FIGS. 1 to 6.

The memory 720 and the storage device 750 may include various types of volatile or non-volatile storage media. For example, the memory 720 may include a read-only memory (ROM) 721 and a random access memory (RAM) 722. The memory 720 may be located inside or outside the processor 710, and the memory 720 may be connected to the processor 710 through various known means.

The input interface device 730 is configured to provide data to the processor 710.

The output interface device 740 is configured to output data from the processor 710.

At least some of the method for load balancing of a base station according to an embodiment may be implemented as a program or software executed in a computing device, and the program or software may be stored in a computer-readable medium.

In addition, at least some of the method for load balancing of a base station according to an embodiment may be implemented as hardware that can be electrically connected to the computing device.

According to an embodiment, when constructing a high-density base station, overload of base stations can be automatically solved without operator intervention, and more accurate load balancing can be performed at the present time by predicting traffic of the near future time.

In addition, by updating the machine learning model using advanced federated learning technology to obtain fast and effective learning results, more accurate traffic prediction becomes possible.

The components described in the example embodiments may be implemented by hardware components including, for example, at least one digital signal processor (DSP), a processor, a controller, an application-specific integrated circuit (ASIC), a programmable logic element such as an FPGA, other electronic devices, or combinations thereof. At least some of the functions or the processes described in the example embodiments may be implemented by software, and the software may be recorded on a recording medium. The components, functions, and processes described in the example embodiments may be implemented by a combination of hardware and software. The method according to embodiments may be embodied as a program that is executable by a computer, and may be implemented as various recording media such as a magnetic storage medium, an optical reading medium, and a digital storage medium. Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing, or to control an operation of a data processing apparatus, e.g., by a programmable processor, a computer, or multiple computers. A computer program(s) may be written in any form of programming language, including compiled or interpreted languages, and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network. Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic or magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read-only memory (CD-ROM), a digital video disk (DVD), etc., and magneto-optical media such as a floptical disk and a read-only memory (ROM), a random access memory (RAM), a flash memory, an erasable programmable ROM (EPROM), and an electrically erasable programmable ROM (EEPROM), and any other known computer readable media. A processor and a memory may be supplemented by, or integrated into, a special purpose logic circuit. The processor may run an operating system (OS) and one or more software applications that run on the OS. The processor device may also access, store, manipulate, process, and create data in response to execution of the software. For the purpose of simplicity, the description of a processor device is used as singular; however, one skilled in the art will appreciate that a processor device may include multiple processing elements and/or multiple types of processing elements. For example, a processor device may include multiple processors or a processor and a controller. In addition, different processing configurations are possible, such as parallel processors. Also, non-transitory computer-readable media may be any available media that may be accessed by a computer, and may include both computer storage media and transmission media. The present specification includes details of a number of specific implementations, but it should be understood that the details do not limit any disclosure or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination. Similarly, even though operations are described in a specific order in the drawings, it should not be understood as the operations needing to be performed in the specific order or in sequence to obtain desired results or as all the operations needing to be performed. In a specific case, multitasking and parallel processing may be advantageous. In addition, it should not be understood as requiring separation of various apparatus components in the above-described example embodiments in all example embodiments, and it should be understood that the above-described program components and apparatuses may be incorporated into a single software product or may be packaged in multiple software products. It should be understood that the embodiments disclosed herein are merely illustrative and are not intended to limit the scope of the disclosure. It will be apparent to one of ordinary skill in the art that various modifications of the embodiments may be made without departing from the spirit and scope of the claims and their equivalents.

What is claimed is:

1. A base station load balancing method in a base station, the method comprising:

updating a traffic amount of a current time by reflecting a predicted traffic amount of a future time in the traffic amount of the current time; and determining parameters necessary for load balancing of the base station by comparing the updated traffic amount of the current time with a predetermined threshold, wherein the updating includes predicting a traffic amount of the future time from the traffic amount of the current time using a prediction model, and wherein a weight value of the prediction model is determined through federated learning between a service and operation management system and a plurality of base stations.

2. The method of claim 1, further comprising:

learning a machine learning model using learning data;

updating the machine learning model; and repeating the learning of a machine learning model and updating of the machine learning model to use the machine learning model as the predictive model.

3. The method of claim 2, wherein the updating of the machine learning model includes:

transmitting a weight value and learning accuracy according to the learning result of the machine learning model to the service and operation management system;

receiving a global weight value determined by the service and operation management system based on the weight values and learning accuracy received from the plurality of base stations; and updating a weight value of the machine learning model with the global weight value.

4. The method of claim 3, wherein the global weight value is an average value of part of the weight values received from the plurality of base stations, and the part of the weight values is randomly selected according to a standard deviation for learning accuracy provided by the plurality of base stations, or are selected in the order of high learning accuracy.

5. The method of claim 1, wherein the updating includes calculating the traffic amount at the current time by applying a first weight value and a second weight value to downlink physical resource block (PRB) usage and uplink PRB usage, respectively, and the first weight value and the second weight value are determined according to a ratio of PRBs allocated to downlink and uplink in the entire PRB.

6. The method of claim 1, wherein the updating includes applying a first weight value to the traffic amount of the current time and applying a second weight value to the predicted traffic amount of the future time, and the first weight value is set to be greater than the second weight value.

7. The method of claim 1, wherein the determining includes adjusting handover-related parameters so that the terminals at the edge of the base station move to another base station earlier if the updated traffic amount at the current time is greater than the threshold value.

8. A base station load balancing method for balancing a load of a plurality of base stations in a base station load control apparatus, the method comprising:

generating and managing policies necessary for a load balancing operation;

modifying the policies using a load balancing result of an overloaded base station; and determining a weight value of a machine learning model used for predicting traffic of a future time in the plurality of base stations by performing federated learning with the plurality of base stations.

9. The method of claim 8, wherein the determining includes:

receiving a weight value and learning accuracy according to a learning result of the machine learning model from the plurality of base stations, respectively;

calculating a global weight value based on the weight values and learning accuracy received from the plurality of base stations; and transmitting the global weight value to the plurality of base stations so that the plurality of base stations update the weight values of the machine learning model with the global weight value.

10. The method of claim 9, wherein the calculating includes:

selecting weight values of part of the weight values received from the plurality of base stations according to the standard deviation for the learning accuracy provided by the plurality of base stations; and calculating an average of the selected weight values of the part as the global weight value.

11. The method of claim 10, wherein the selecting includes:

randomly selecting the weight values of the part if a random value between 0 and 1 is less than a value corresponding to the standard deviation; and selecting the weight values of the part in order of high learning accuracy if the random value is equal to or greater than a value calculated based on the standard deviation.

12. The method of claim 11, wherein the value corresponding to the standard deviation is calculated based on Equation 1, the Equation 1 is $$E=\min(1,\delta\times\text{Std}),0\leq\delta<1, \text{ and}$$

wherein the δ has a value between 0 and 1, and the Std represents the standard deviation.

13. A base station load balancing apparatus for load balancing by interworking with a service and operation management system in a base station, the apparatus comprising:

a local traffic predictor that predicts a traffic amount in a future time using a prediction model; and a load balancing processor that updates a traffic amount of a current time by reflecting the predicted traffic amount of the future time in the traffic amount of the current time, and determines parameters necessary for load balancing of the base station by comparing the updated traffic amount of the current time with a predetermined threshold, wherein the local traffic predictor includes:

a model updater for updating a machine learning model with a global weight value determined by the service and operation management system through federated learning between a plurality of base stations and the service and operation management system; and a model learner for learning the updated machine learning model, and wherein the prediction model is finally generated through repetition of the learning the machine learning model and updating the machine learning model.

14. The apparatus of claim 13, wherein the model learner transmits a weight value and learning accuracy according to a learning result of the machine learning model to the service and operation management system, and the global weight value is determined by the service and operation management system based on the weight values and learning accuracy received from the plurality of base stations.

15. The apparatus of claim 14, wherein the global weight value is an average value of part of the weight values received from the plurality of base stations, and the part of the weight values is randomly selected according to a standard deviation for learning accuracy provided by the plurality of base stations, or are selected in the order of high learning accuracy.

16. The apparatus of claim 13, wherein the load balancing processor includes an overload determiner for calculating the updated traffic amount of the current time by applying a first weight value to the traffic amount of the current time and applying a second weight to the predicted traffic amount of the future time, and the first weight value is set to be greater than the second weight value.

17. The apparatus of claim 13, wherein the load balancing processor includes a mobility load balancing (MLB) controller for adjusting handover-related parameters so that the terminals at the edge of the base station move to another base station earlier if the updated traffic amount at the current time is greater than the threshold value.

* * * * *